United States Patent [19]

Leeves et al.

[11] Patent Number: 5,195,679

[45] Date of Patent: Mar. 23, 1993

[54] RAIL PADS

[75] Inventors: Geoffrey G. Leeves, Bearsted; Paul A. Abraham, Dunstable, both of United Kingdom

[73] Assignee: Pandrol Limited, Weybridge, England

[21] Appl. No.: 909,581

[22] Filed: Jul. 6, 1992

Related U.S. Application Data

[63] Continuation-in-part of Ser. No. 720,859, Jul. 16, 1991, abandoned.

[30] Foreign Application Priority Data

Jan. 20, 1989 [GB] United Kingdom ............ 8901274

[51] Int. Cl.$^5$ ............................................. E01B 9/68
[52] U.S. Cl. ................... 238/283; 238/382; 267/141
[58] Field of Search .............. 238/264, 283, 304, 306, 238/382; 267/136, 141, 153

[56] References Cited

U.S. PATENT DOCUMENTS

| 3,026,224 | 3/1962 | Rogers, Jr. | 267/153 X |
|---|---|---|---|
| 3,311,331 | 3/1967 | Steimen | 267/153 X |
| 3,369,753 | 2/1968 | Olson | 238/283 |
| 4,254,908 | 3/1981 | Matsubara | 238/283 |
| 4,618,093 | 10/1986 | Young et al. | 238/283 |
| 4,648,554 | 3/1987 | McQueen | 238/283 |
| 4,771,944 | 9/1988 | Brister et al. | 238/283 |

FOREIGN PATENT DOCUMENTS

| 805281 | 3/1951 | Fed. Rep. of Germany | 238/283 |
|---|---|---|---|
| 933342 | 9/1955 | Fed. Rep. of Germany | 238/283 |
| 1964039 | 7/1971 | Fed. Rep. of Germany | 238/283 |
| 2504165 | 8/1976 | Fed. Rep. of Germany | . |
| 2753005 | 7/1978 | Fed. Rep. of Germany | 238/283 |
| 2284708 | 4/1976 | France | . |
| 528544 | 9/1955 | Italy | 238/283 |
| 338481 | 7/1959 | Switzerland | 238/283 |
| 180437 | 3/1966 | U.S.S.R. | . |
| 611753 | 5/1946 | United Kingdom | . |
| 841776 | 6/1958 | United Kingdom | . |
| 860209 | 2/1961 | United Kingdom | 238/283 |
| 2161524 | 1/1986 | United Kingdom | . |

Primary Examiner—Michael S. Huppert
Assistant Examiner—Scott L. Lowe
Attorney, Agent, or Firm—Norbert P. Holler

[57] ABSTRACT

A rail pad comprises a membrane (3) from opposite faces of which there project protrusions (4, 5), which may be ribs, possibly extending along the pad, perhaps over its whole length, or studs. The protrusions are such that no line perpendicular to the membrane passes through more than one of the protrusions. The pad is such that it is stiffer on one side than the other, for example because the ratio between the total area of protruding material and the total area of membrane free of protrusions is greater at the stiffer side of the pad than the other. The pad is preferably made of thermoplastic copolyester elastomer.

10 Claims, 3 Drawing Sheets

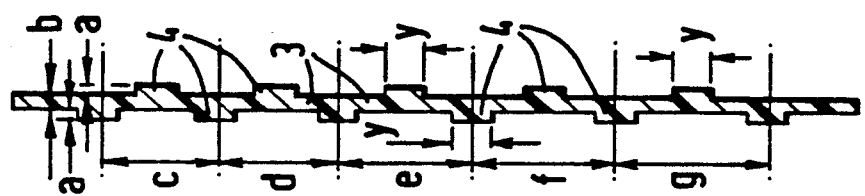
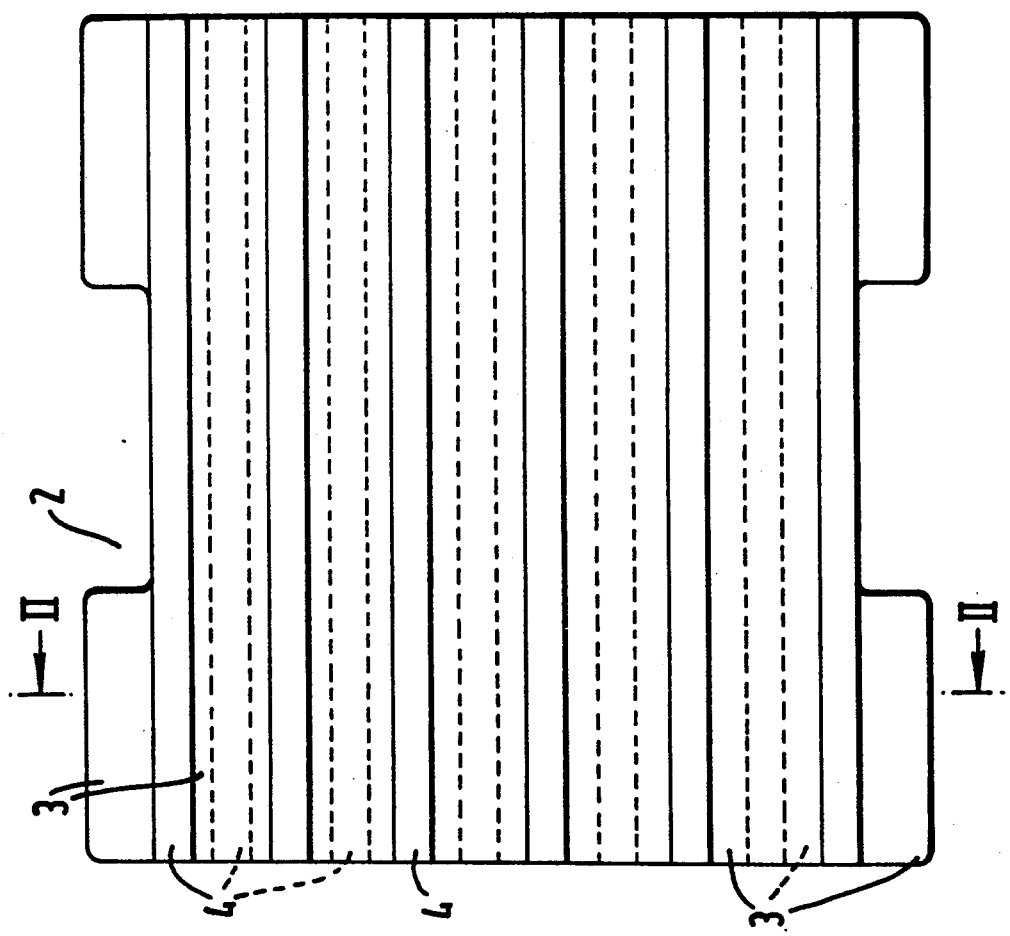

FIG. 3
FIG. 4
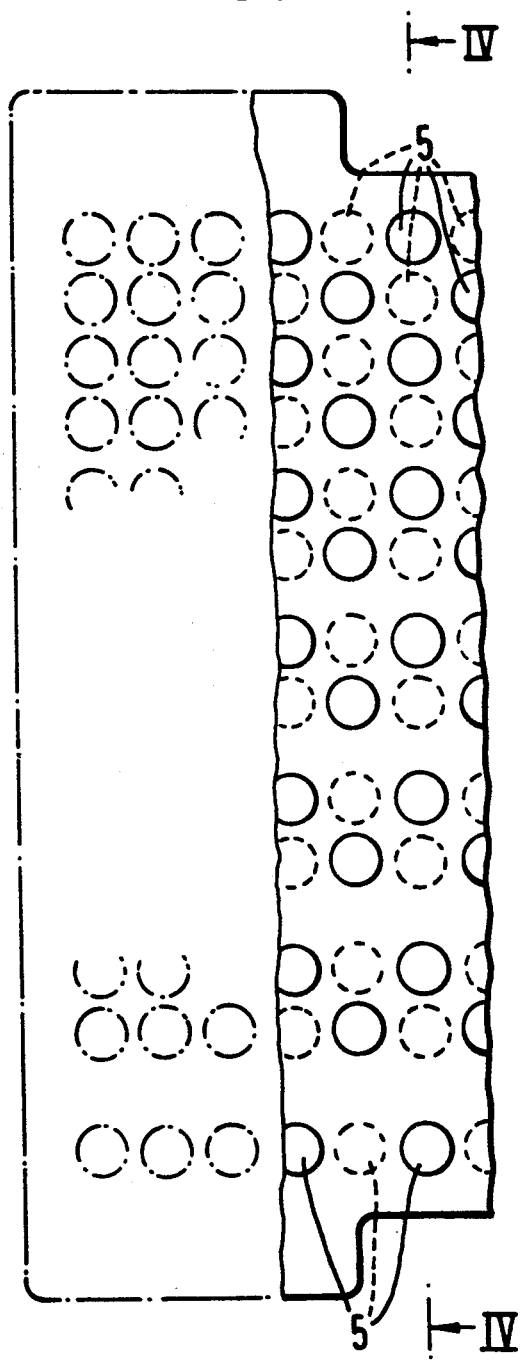
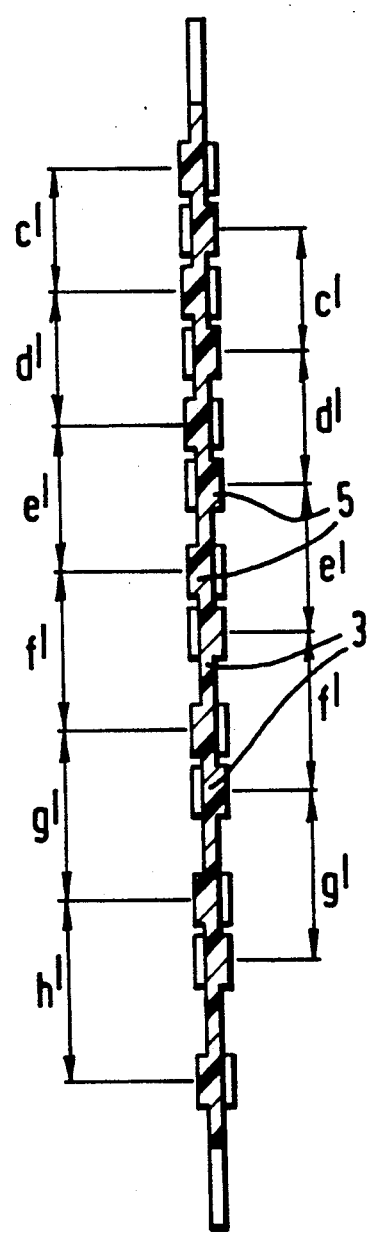

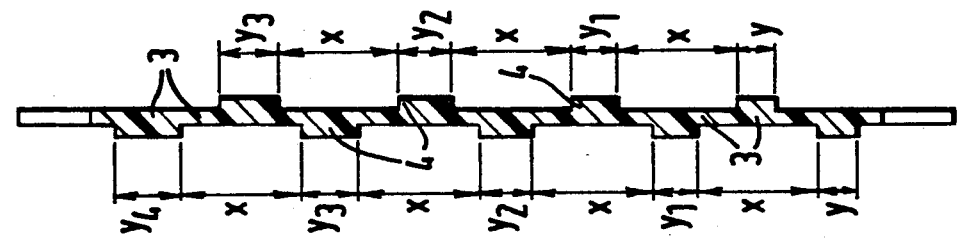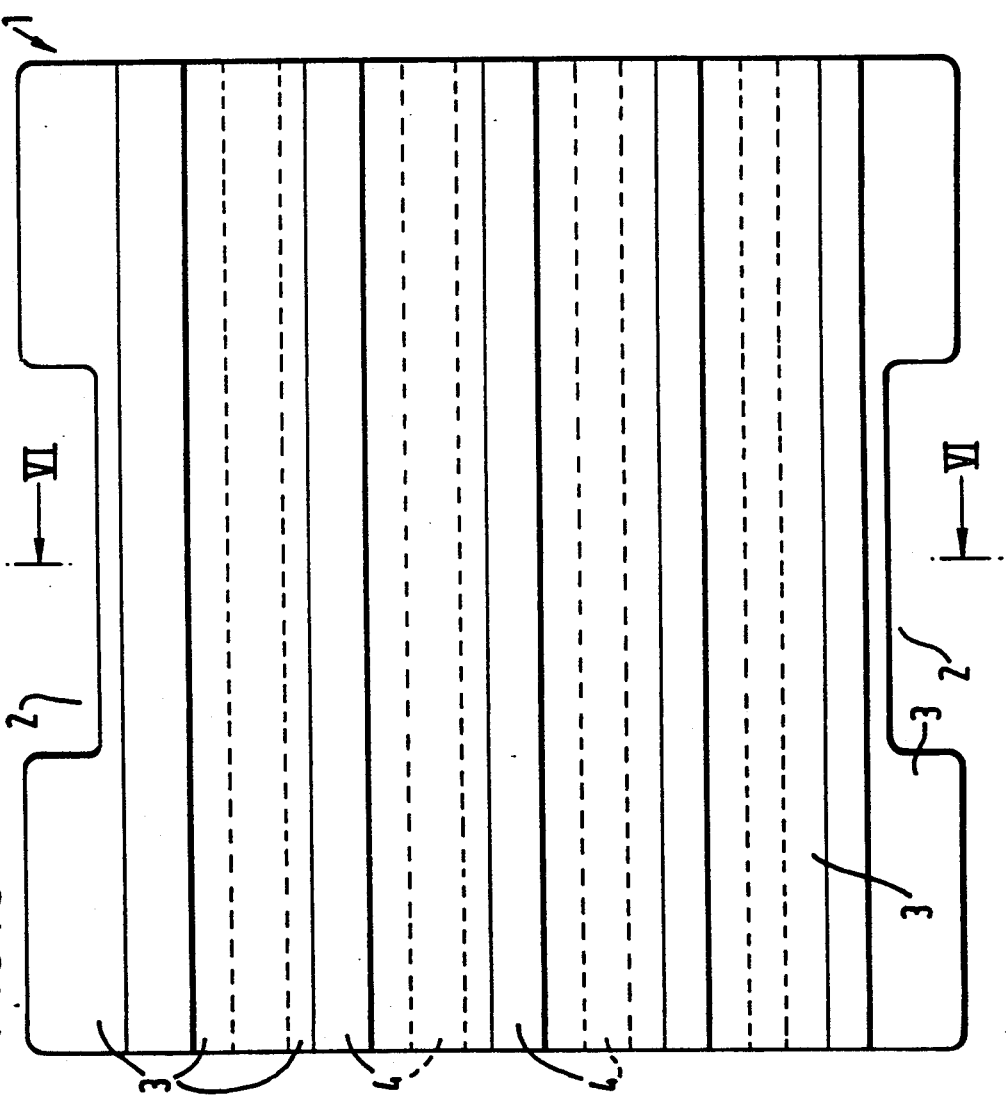

RAIL PADS

CROSS-REFERENCES TO RELATED APPLICATIONS

This application is a continuation-in-part of U.S. patent application Ser. No. 720,859, now abandoned, in the names of Geoffrey Gordon Leeves and Paul Anthony Abraham.

BACKGROUND OF THE INVENTION

1. Field of the Invention

The present invention relates to rail pads, and particularly to a pad which is positioned between the foot of a railway rail and an underlying rail foundation on which the rail stands, in order to cushion the rail from the foundation, so as to limit the transmission of dynamic forces to the foundation. The pad also insulates the rail electrically from the foundation if it is required to pass electric currents through the rail, for example for signalling work.

2. Description of the Prior Art

In some cases such a pad comprises a membrane of elastomeric material, for example natural rubber, with protrusions extending in opposite directions from its two major faces: see, for example, United Kingdom Patent Specifications Nos. 841776 and 2161524. The protrusions may, for example, be in the form of cylindrical studs or ribs running along and/or across the pad.

In some pads, for example as disclosed in United Kingdom Patent Specification No. 611753, U.S.S.R. Patent Specification No. 180437, and German Patent Specification No. 2504165, the protrusions on one face of the pad do not register, i.e. overlap, with those on the opposite face so that when the membrane is horizontal no vertical line through the pad passes through more than one protrusion. It is believed, however, that none of these pads have been used, or proposed for use, in a rail/rail foundation assembly.

SUMMARY OF THE INVENTION

According to the present invention, there is provided a pad which is suitable for positioning between the foot of a railway rail and an underlying rail foundation in order to cushion the rail from the foundation, the pad comprising a membrane of elastomeric material having two major faces from which protrusions extend, such that when the membrane is horizontal no vertical line passes through more than one protrusion, characterised in that said pad is stiffer on one side than on the other.

Such variation in stiffness between the two sides of the pad is desirable at curves on a railway track and may be obtained by varying across the pad the composition of the material of the pad. However, it is more convenient to ensure that the ratio between the total area of protruding material and the total area of membrane free from protrusions is greater at the stiffer side of the pad than at the less stiff side of the pad. This may be achieved by having the protrusions closer together and/or wider where greater stiffness is required.

The pad is preferably made of so-called engineering thermoplastic elastomer with high flexural strength, for example a thermoplastic copolyester elastomer such as is sold by E. I. Du Pont de Nemours & Company under the Registered Trade Mark "HYTREL"—see their United Kingdom Patent Specifications Nos. 1323727, 1372630 and 1404340.

When a pad embodying the present invention is in use between a rail and a rail foundation, instead of the pad being subjected only to compression, as in the prior rail pads disclosed in United Kingdom Specification Nos. 841776 and 2161524, the pad is subjected also to bending. With only a small downward force on the pad, the membrane adopts a wavy configuration but does not touch the rail or the rail foundation. With an increasing downward force on the pad the membrane is further distorted and at first just touches the rail directly above each protrusion on the lower face of the membrane and just touches the foundation directly below each protrusion on the upper face of the membrane Further increase of the downward force on the pad increases the area of the membrane which is in contact with the rail and the foundation and eventually a point is reached where further increase in the downward force on the pad does not result in substantial further depression or distortion of the protrusions or the membrane if, as is proposed, the material of the pad has a Shore "A" hardness of at least 30, better still about 40 or more, even as high as 72 or more. The desirable value depends, inter alia, on the anticipated downward forces on the pad. The fact that when the downward force on the pad increases a point is eventually reached at which further increase of the force will not result in substantial further compression or distortion of the membrane or the protrusions has the advantage that when a particularly heavy train passes over the pad the pad does not become so much thinner, and the rail does not sink so far, that the downward force exerted by the clip on the foot of the rail becomes unacceptably low.

Preferably, the distance between two adjacent protrusions on the same face of the membrane is at least 1½ times, and desirably twice, the width of the two protrusions. Each protrusion may be an island; it may have a circular end face, in which case it may be a short cylinder.

Each protrusion may be elongate as seen from above when the membrane is horizontal, in which case it may be a rib extending along the entire length of the pad, measured in the direction in which vehicles are intended to travel over the pad, and each protrusion may be of rectangular cross-section.

BRIEF DESCRIPTION OF THE DRAWINGS

FIG. 1 shows a plan view of a first pad embodying the present invention;

FIG. 2 shows a sectional view of the same pad, taken as indicated by the arrows II in FIG. 1;

FIG. 3 shows a plan view of part of a second pad which embodies the present invention;

FIG. 4 shows a sectional view of the pad of FIG. 3, taken as indicated by the arrows IV in FIG. 3;

FIG. 5 shows a plan view of a third pad embodying the present invention; and

FIG. 6 shows a sectional view of the third pad, taken as indicated by the arrows VI in FIG. 5.

FIGS. 1 and 2 show a substantially rectangular pad 1 which is intended to lie between the foot of a railway rail and a rail foundation, for example a concrete railway sleeper, in order to cushion the rail and, if the rail is to be used for carrying electric currents, to electrically insulate the rail from the foundation. The rail is intended to extend from left to right, considering FIG. 1, i.e. vehicles travelling along the rail will travel from left to right or from right to left over the pad. The rail is to be held down by so-called P-R clips or e-clips as shown in United Kingdom Patent Specification No. 1213762 or 1510224 which are held down by clip-anchoring devices, which, if the rail foundation is of concrete, may be as shown in those patent specifications. To prevent the pad moving along the rail, a substantially rectangular recess 2 is formed at the centre of each side of the pad and in that recess will project a part of one of the clip-anchoring devices.

The material of which the pad is made, by a moulding process, is a thermoplastic copolyester elastomer of high flexural strength and it is of uniform composition throughout the pad.

The pad comprises a central membrane 3 from both faces of which protrude ribs 4 of substantially rectangular cross-section which are all similar and extend the entire length of the pad, i.e. in the direction of travel of the vehicles over the pad. Each rib except the ones nearest the recesses 2 lies centrally between two ribs protruding from the opposite face of the membrane 3.

The thickness of the membrane is b and the height of each rib is a, which may conveniently be in the range of 0.5b to 0.75b.

On each face of the pad the ribs are of width y. The pad is stiffer on the side shown uppermost in FIG. 1 than on the side shown lowermost, this being on account of the fact that the ribs 4 are closer together at the side shown uppermost. The pitch c of the two ribs shown to the left at the top end of FIG. 2 is, in the example shown, three times the width v of the ribs and the pitches d, e, f, and g between the other pairs of adjacent ribs on the same face of the membrane 3 are 1.125 c, 1.25 c, 1.375 c and 1.5 c, respectively.

FIGS. 3 and 4 show part of a pad which is the same as that of FIGS. 1 and 2, except that the protrusions on both faces are islands, each completely surrounded by a part of the membrane 3 which is free from protrusions. In the illustrated case each protrusion has a circular end face and is in the form of a short cylinder or cylindrical stud 5, the height of which is in the range 0.5 to 0.75 times the thickness of the membrane 3. The studs are all similar and arranged with uniform spacing in rows extending parallel to the length of the pad. The studs also extend in columns extending parallel to the width of the pad, but the spacing between the columns varies similarly to the ribs of FIGS. 1 and 2, such that the pitch c' of the two columns shown to the left at the top of FIG. 4 is less than the pitch d', and so on. Except at the edges of the pad, each stud is opposite the centre of a group of four studs protruding from the opposite face of the membrane.

FIGS. 5 and 6 show a pad which is similar to that of FIGS. 1 and 2, except that the width of the ribs 4 increases progressively across the width of the pad such that the pad is stiffer at the side shown uppermost in FIG. 5 than at the side shown lowermost, i.e. width $y_4 > y_3 > y_2 > y_1 > y$.

We claim:

1. A pad which is suitable for positioning between the foot of a railway rail and an underlying rail foundation in order to cushion the rail from the foundation, the pad comprising a membrane (3) of elastomeric material having two major faces from which protrusions (4 or 5) extend, such that when the membrane (3) is horizontal no vertical line passes through more than one protrusion (4 or 5), characterised in that said pad is stiffer on one side than on the other side.

2. A pad according to claim 1, characterised in that the ratio between a total area of protruding material (4 or 5) and a total area of membrane (3) free from protrusions (4 or 5) is greater at the stiffer side of the pad than at the less stiff side of the pad.

3. A pad according to claim 2, characterised in that the protrusions (4 or 5) are all identical and their spacing in the direction of the width of the pad increases from the stiffer side to the less stiff side of the pad.

4. A pad according to claim 2, characterised in that each protrusion (5) is an island.

5. A pad according to claim 4, characterised in that each protrusion (5) has a circular end face.

6. A pad according to claim 5, characterised in that each protrusion (5) is a short cylinder.

7. A pad according to claim 2, characterised in that each protrusion (4) is elongate as seen from above when the membrane (3) is horizontal.

8. A pad according to claim 7, characterised in that each protrusion (4) is of rectangular cross-section.

9. A pad according to claim 7, characterised in that each protrusion (4) is a rib extending along the entire length of the pad, measured in a direction in which vehicles are intended to travel over the pad.

10. A pad according to claim 9, characterised in that each protrusion (4) is of rectangular cross-section.

* * * * *